United States Patent
Godin et al.

(10) Patent No.: US 9,060,373 B2
(45) Date of Patent: Jun. 16, 2015

(54) DE-ACTIVATION OF DATA BEARER CONNECTIONS UPON OUTGOING HANDOVER FROM A HOME CELL

(75) Inventors: Philippe Godin, Viroflay (FR); Sudeep Palat, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 140 days.

(21) Appl. No.: 13/876,116

(22) PCT Filed: Sep. 28, 2011

(86) PCT No.: PCT/EP2011/066878
§ 371 (c)(1),
(2), (4) Date: Mar. 26, 2013

(87) PCT Pub. No.: WO2012/041912
PCT Pub. Date: Apr. 5, 2012

(65) Prior Publication Data
US 2013/0188605 A1    Jul. 25, 2013

(30) Foreign Application Priority Data
Sep. 29, 2010    (EP) .................................... 10306049

(51) Int. Cl.
*H04W 80/04*    (2009.01)
*H04L 12/28*    (2006.01)
*H04W 76/06*    (2009.01)
*H04W 8/08*    (2009.01)
*H04W 84/04*    (2009.01)

(52) U.S. Cl.
CPC .............. *H04W 76/06* (2013.01); *H04W 8/082* (2013.01); *H04W 84/045* (2013.01)

(58) Field of Classification Search
USPC .......................................... 370/328, 331, 401
See application file for complete search history.

(56) References Cited

U.S. PATENT DOCUMENTS

| | | | |
|---|---|---|---|
| 7,697,934 B2 | 4/2010 | Vikberg et al. | |
| 2011/0299463 A1* | 12/2011 | Bachmann et al. | 370/328 |
| 2012/0008551 A1* | 1/2012 | Giaretta et al. | 370/328 |
| 2012/0147852 A1* | 6/2012 | Ganapathy | 370/331 |
| 2013/0143532 A1* | 6/2013 | Liu | 455/411 |

(Continued)

FOREIGN PATENT DOCUMENTS

| | | |
|---|---|---|
| CN | 101076981 | 11/2007 |
| WO | WO 2010/102652 A1 | 9/2010 |

OTHER PUBLICATIONS

NEC, "S2-102294: Details on LIPA/SIPTO Solution 6", 3GPP TSG SA WG2 Meeting #79, May 10-14, 2010, Kyoto, Japan.

(Continued)

*Primary Examiner* — Andrew Lee
(74) *Attorney, Agent, or Firm* — Fay Sharpe LLP

(57) ABSTRACT

The present invention relates to a home arrangement (7). In accordance with an embodiment of the invention, the home arrangement comprises: —a radio access node (2) configured to operate a home cell (A), with detecting means for detecting a handover condition for a particular mobile device (1), and —a local data gateway (3) supporting at least one alive data bearer connection for connection of the particular mobile device to a local data network (11), wherein the local data gateway comprises releasing means for triggering the de-activation of the at least one alive data bearer connection upon detection of said handover condition. The present invention also relates to a method for releasing network resources.

6 Claims, 3 Drawing Sheets

(56) References Cited

U.S. PATENT DOCUMENTS

2013/0279475 A1* 10/2013 Nishida .......... 370/331
2014/0295852 A1* 10/2014 Wu et al. .......... 455/442

OTHER PUBLICATIONS

QualComm Incorporated, "Further analysis for LIPA/SIPTO solution for H(e)NB using a local PDN connection in Solution 1", TD S2-101107, 3GPP TSG SA WG2 Meeting #78, Feb. 22-26, 2010, San Francisco, USA.

LG Electronics, et, al., "Call flows for LIPA Solution1 Variant 1 with collocated H(e)NB and L-GW", TD S2-102883, 3GPP TSG SA WG2 Meeting #79, May 10-14, 2010, Kyoto, Japan.

Motorola et al., LIPA Solution-1, Stand-alone L-GW with Sxx being both user-plane and control-plane, $3^{rd}$ Generation Partnership Project (3GPP), 3GPP TSG SA WG2 Meeting #79, TD S2-102433, XP050434593, pp. 1-9, Kyoto, Japan, May 10-14, 2010.

International Search Report for PCT/EP2011/066878 dated Nov. 9, 2011.

China Office Action dated Mar. 3, 2015.

* cited by examiner

DE-ACTIVATION OF DATA BEARER CONNECTIONS UPON OUTGOING HANDOVER FROM A HOME CELL

TECHNICAL FIELD OF THE INVENTION

The present invention relates to the release of data bearer connections when a mobile device leaves a home cell.

TECHNICAL BACKGROUND OF THE INVENTION

Local IP Access (LIPA) is the ability for an IP-capable mobile device to access a subscriber's Local Area Network (LAN) as well as the Internet directly using the air interface of a femto cell operated by a home base station, such as a Home NodeB (HNB) for Universal Mobile Terrestrial System (UMTS) or a Home evolved-NodeB (HeNB) for Long Term Evolution (LTE).

The ever increasing content available online via email, social networking sites, blogs, RSS feeds, multimedia calls, streaming video and online music, coupled with faster and higher capacity equipment driven by Personal Digital Assistants (PDAs), smart phones and netbooks have led to a boom in the demand for Internet data access using high-speed mobile network infrastructure.

As a result, many operators are faced with bandwidth and network capacity limitations, thus putting a tremendous strain on the existing network infrastructure—hence operators are investing significantly in ramping up existing network capacity on the access network as well as in the core of the network. On the access network side, the introduction of H(e)NB ensures efficient usage of radio spectrum by allowing home users to access the network through the H(e)NB using a local IP backhaul link to the core network. However, this puts an increasing amount of stress on core network nodes since more H(e)NBs connected to the core network means that these nodes have to handle exponentially higher traffic.

Since H(e)NB typically use the ISP's broadband link to provide backhaul connectivity to the core network, it would lessen the stress on core network nodes if IP traffic generated via the HNB were routed through the ISP's network. This would also reduce the number of hops taken by the IP data to reach the destination. Another benefit would be the ability to communicate with other devices within the local subnet without having to go via the mobile operator's core network—hence keeping local traffic truly local.

LIPA uses a Local data GateWay (L-GW) in the home or enterprise network that provides an SGi interface to the IP network. In release 10 of $3^{rd}$ Generation Partnership Project (3GPP), the L-GW can only and is always collocated with the H(e)NB.

when the H(e)NB has one LIPA connection, one problem in release 10 is the handling of outgoing handovers from the home cell. Indeed, in release 10, the LIPA connections must be torn down at outgoing handover and cannot continue. Necessary means must therefore be found to tear down this connection.

The best existing solution discussed so far in 3GPP is to have the core network, i.e. the Serving Gateway Support Node (SGSN) for UMTS or the Mobility Management Entity (MME) for LTE, trigger the deactivation of the LIPA Packet Data Network (PDN) connection when it is notified of the outgoing handover.

However, this solution is not good enough as it implies that the SGSN or MME is involved in the relocation to be aware of it. Indeed, when the outgoing handover is triggered towards another home cell, the handover signaling may not go via the SGSN or MME which is kept unaware of the move. In this case, the SGSN or MME cannot trigger the deactivation of the LIPA connection.

In addition, even if made aware of the handover, the timing may not be appropriate because the deactivation by the SGSN or MME would take place either during the handover, or after the handover whereas LIPA resources are not allowed at target side.

SUMMARY OF THE INVENTION

It is an object of the present invention to provide for effective and coherent release of LIPA PDN connections in the event of a mobile device handing over from a home cell towards another home cell.

In accordance with a first aspect of the invention, a home arrangement comprises:
  a radio access node configured to operate a home cell, with
    detecting means for detecting a handover condition for a particular mobile device, and
  a local data gateway supporting at least one alive data bearer connection for connection of said particular mobile device to a local data network,
wherein said local data gateway comprises releasing means for triggering the de-activation of said at least one alive data bearer connection upon detection of said handover condition.

In accordance with another aspect of the invention, a method for releasing network resources comprises the steps of:
  by a radio access node configured to operate a home cell, detecting a handover condition for a particular mobile device,
  by a local data gateway supporting at least one alive data bearer connection for connection of said particular mobile device to a local data network, triggering the de-activation of said at least one alive data bearer connection upon detection of said handover condition.

The basic idea is to have the H(e)NB trigger the release of all LIPA PDN connections associated with a mobile device for which a handover condition has been detected, instead of the SGSN or MME trigger. The handover condition can be detected by the mobile device and reported to the H(e)NB, or can be detected by the H(e)NB, depending on the configured measurement policy. The RAN part of the H(e)NB communicates internally with its L-GW part so that the L-GW part triggers a network initiated LIPA PDN connection release. Since the L-GW is collocated in the H(e)NB, it is as if the H(e)NB would deactivate the LIPA PDN connection itself.

In one embodiment of a home arrangement according to the invention, said radio access node is further configured to trigger a handover for said particular mobile device upon completion of the de-activation of said at least one alive data bearer connection by said local data gateway.

In the corresponding embodiment of a method according to the invention, said method further comprises the step of, by said radio access node, triggering a handover for said particular mobile device upon completion of the de-activation of said at least one alive data bearer connection by said local data gateway.

Once the LIPA PDN connection is released, the L-GW can inform the H(e)NB internally so that it can trigger and carry out the handover procedure.

In one embodiment of a home arrangement according to the invention, said de-activation of said at least one alive data bearer connection is triggered by issuing a bearer de-activation request to a service data gateway.

In the corresponding embodiment of a method according to the invention, said triggering step comprises the step of issuing a bearer de-activation request to a service data gateway.

Further characterizing embodiments are mentioned in the appended claims.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
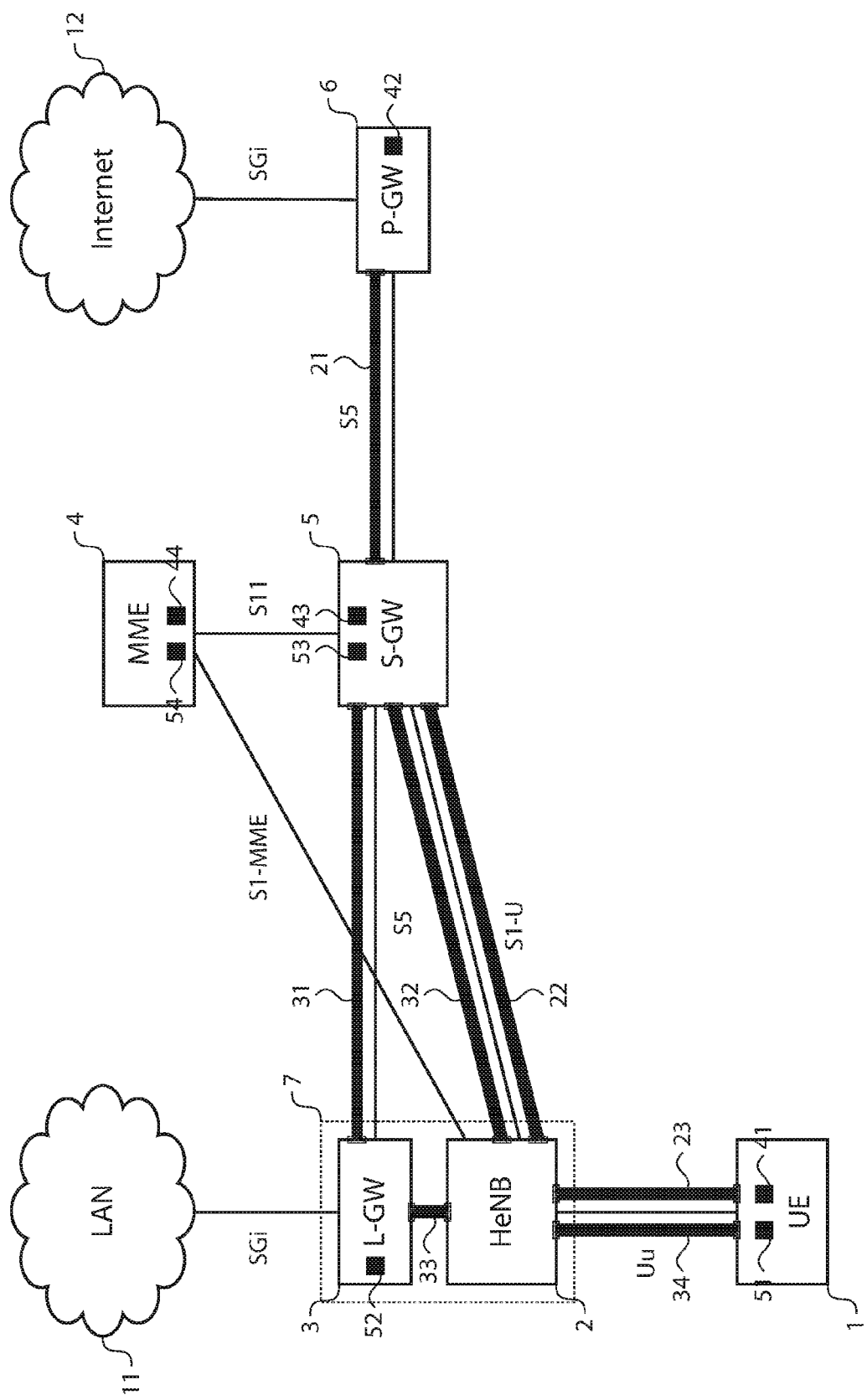
FIG. 1 represents an LTE mobile communication system.

FIG. 1 represents an LTE mobile communication system which comprises the following elements.

A User Equipment (UE) 1 is in communication with an operator's network via a HeNB arrangement 7. The HeNB arrangement 7 is made of a classical HeNB radio part 2, but has in addition a collocated L-GW function 3 allowing to operate in LIPA mode.

The HeNB arrangement 7 communicates with the Serving GW (S-GW) 5 and the MME 4. The S-GW 5 communicates with the PDN GW (P-GW) 6 that provides an access to an IP external network 12 with its SGi interface.

The L-GW 3 provides an access to a LAN 11 via an SGi interface as well.

As an illustrative example, the UE 1 is shown as communicating via two PDN connections. One or more Evolved Packet System (EPS) bearers are up and running for each of these PDN connections. These EPS bearers go over all interfaces as follows.

In the example of FIG. 1, a first EPS bearer towards the P-GW 6 is made of an S5 bearer 21, an S1-U bearer 22 and an Uu bearer 23. Associated contexts exist which are contexts 42 in the P-GW 6, 43 in the S-GW 5, 44 in the MME 4 and 41 in the UE 1.

A second EPS bearer towards the L-GW 3 is made of an S5 bearer 31, an S1-U bearer 32 and an Uu bearer 34. Because LIPA is operated, a direct user plane path 33 also exist within the HeNB arrangement 7 between the HeNB 2 and the collocated L-GW 3. Associated contexts exist which are 52 in the L-GW 3, 53 in the S-GW 5, 54 in the MME 4 and 51 in the UE 1.

The bearers 22, 23, 32, 33 and 34 are released when the UE 1 switches back to idle mode. The other bearers and the aforementioned contexts remain.

While in connected mode, the HeNB 2 (like any eNB radio node) may decide to trigger a handover e.g. based on some measurement report from the UE 1. The HeNB 2 identifies the suitable target cell and associated eNB which can also be an HeNB.

Figure 2:
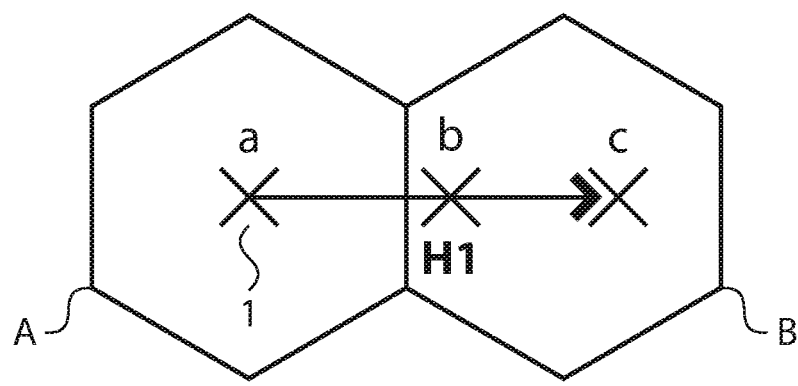
FIG. 2 represents a radio coverage area comprising two home cells.

In FIG. 2 an example of such handover is shown from a cell A operated by the HeNB 2 to a cell B operated by another HeNB.

The UE 1 is in connected mode and uses two active PDN connections at position a, within the coverage area of the home cell A.

The UE 1 next moves towards position c while communication sessions are on-going.

At position b, the radio signal from home cell B incurs a lower path loss than the radio signal from home cell A. Provided the difference between the respective path losses is beyond some configured handover margin, an outbound handover H1 is triggered for handing over the on-going session towards the home cell B.

Figure 3:
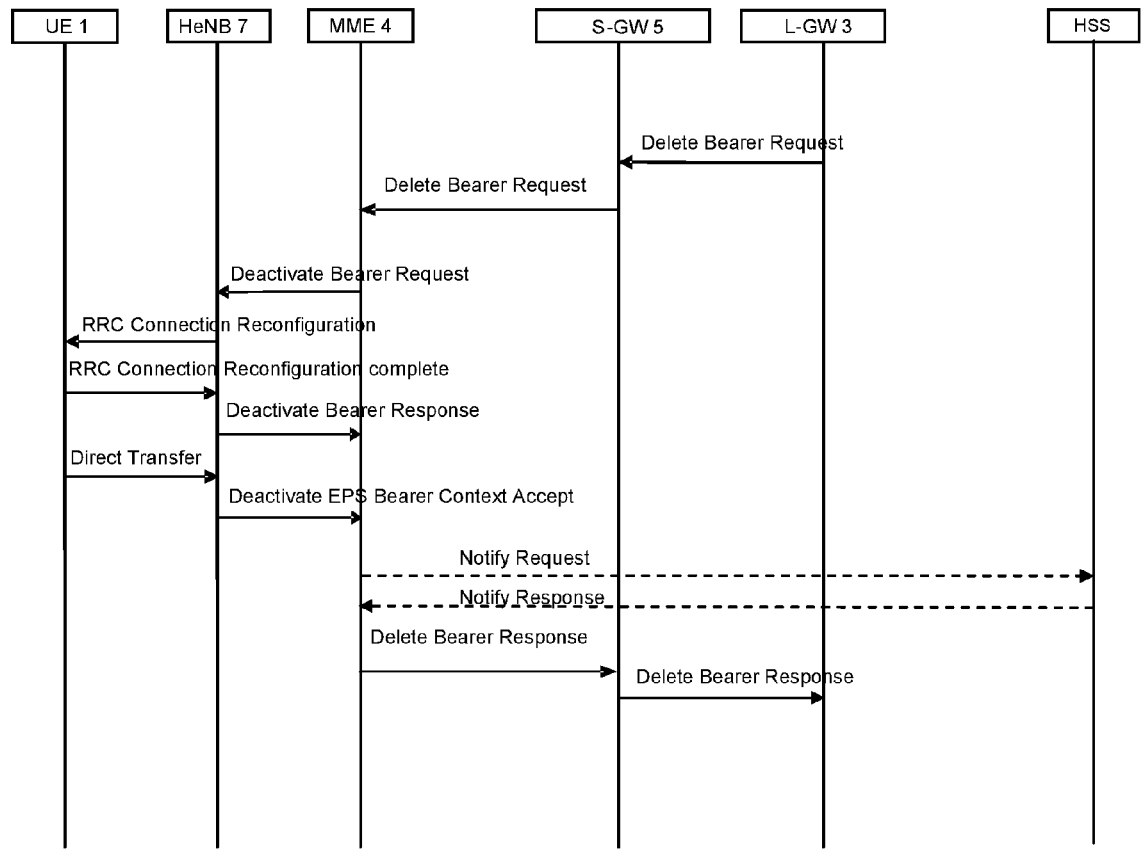
FIG. 3 represents a message flow chart of messages exchanged during the release of LIPA PDN connections.

Before triggering the handover for the UE 1 (or may be in parallel), the source HeNB 2 informs its collocated L-GW 3 to trigger the deactivation of the PDN connection(s) that the UE 1 has with the L-GW 3. The deactivation procedure (PDN GW initiated bearer deactivation procedure) triggered by the L-GW 3 is depicted in FIG. 3.

The L-GW 3 therefore sends a Delete Bearer Request message to the S-GW 5. The S-GW 5 in turn sends a Delete Bearer Request message to the MME 4. Upon receipt of the Delete Bearer Request message, the MME 4 sends the Deactivate Bearer Request message to the HeNB 2 which triggers in turn a corresponding RRC Reconfiguration procedure in order to release the relevant bearers (which in fact correspond to the LIPA connection).

The HeNB 2 replies to the MME 4 including the Deactivate EPS Bearer Context Accept message. The MME 4 notifies a HSS if needed, then the S-GW 5 and L-GW 3 are informed of the successful completion of the procedure by respective Delete Bearer Response messages.

In the present example call flow, once the deactivation is successful, the L-GW 3 can inform back the HeNB 2 of the success so that the HeNB 2 can trigger the handover procedure for the UE 1 towards the home cell B.

The same description applies to UMTS networks, e.g. with the MME 4 and S-GW 5 merged into a SGSN, and with similar mechanisms.

It is to be noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, digital signal processor (DSP) hardware, network processor, application specific integrated circuit (ASIC), field programmable gate array (FPGA), etc. Other hardware, conventional and/or custom, such as read only memory (ROM), random access memory (RAM), and non volatile storage, may also be included.

The invention claimed is:

1. A home arrangement comprising:
   a radio access node configured to operate a home cell, and configured to detect a handover condition for a particular mobile device; and
   a local data gateway configured to support at least one data bearer for connection of said particular mobile device to a local data network through a service data gateway,
   wherein said local data gateway is further configured to, upon detection of said handover condition, issue a bearer de-activation request to said service gateway to de-activate said at least one data bearer upon detection of said handover condition.

2. The home arrangement according to claim 1, wherein said radio access node is further configured to trigger a handover for said particular mobile device upon completion of the de-activation of said at least one data bearer.

3. The home arrangement according to claim 1, wherein said radio access node and said local data gateway are configured to operate according to Long Term Evolution LTE technology.

4. The home arrangement according to claim 1, wherein said radio access node and said local data gateway are configured to operate according to Universal Mobile Telecommunication System UMTS technology.

5. A method for releasing network resources, said method comprising:
   by a radio access node configured to operate a home cell, detecting a handover condition for a particular mobile device,
   by a local data gateway configured to support at least one data bearer for connection of said particular mobile device to a local data network through a service data gateway, and upon detection of said handover condition, issuing a bearer de-activation request to said service data gateway to de-activate said at least one data bearer.

6. A method according to claim 5, wherein said method further comprises, by said radio access node, triggering a handover for said particular mobile device upon completion of the de-activation of said at least one data bearer.

* * * * *